Dec. 30, 1969     L. B. HARRIS     3,486,822

SAMPLING UNIT FOR CONTINUOUS DISPLAY OF SPECTRAL ANALYSIS

Filed Oct. 1, 1965

United States Patent Office 3,486,822
Patented Dec. 30, 1969

3,486,822
SAMPLING UNIT FOR CONTINUOUS DISPLAY OF SPECTRAL ANALYSIS
Lee B. Harris, Schenectady, N.Y.
(350 Avalon Drive, Rochester, N.Y. 14618)
Filed Oct. 1, 1965, Ser. No. 492,006
Int. Cl. G01j 3/42
U.S. Cl. 356—83                                    5 Claims

ABSTRACT OF THE DISCLOSURE

A plurality of signals is obtained representing the output of a spectrometric instrument at each of a plurality of selected points in the repetitive spectral scan of the instrument. As each selected point in the spectral scan is reached, the output of the instrument is sampled, and a signal which is a fixed function of the sampled output is maintained until the scan of the instrument again arrives at the selected point. As the output of the instrument changes from scan to scan, each signal changes accordingly and reflects the changing output at the corresponding selected point.

---

This invention relates to spectrometric instruments and more particularly to a system for selectively and repetitively sampling a spectrum and providing continuous outputs representing the intensity of the spectrum at selected points.

Present-day spectrometric instruments and appurtenances do not include apparatus for quickly and directly sampling selected points of a spectrum, on a repetitive basis, in order to provide continuous outputs representing spectral intensity at these points. Experimenters, however, have felt a need for such apparatus, and some have attempted to fulfill this need in a less than satisfactory way by use of motion pictures; that is, by displaying the spectrum on an oscilloscope, the trace could be filmed. The disadvantages of this method are first the labor and delay in processing the film and second the labor and time required to read and transcribe the filmed data.

One object of this invention is to provide a method and apparatus for the continuous indication of the intensity at one or more selected points in a spectrum.

Another object is to provide a method and apparatus for indication of the spectral intensity at selected points of the spectrum concurrent with its measurement.

Another object is to provide a method and apparatus for selecting any point of a spectrum for continuous monitoring.

Another object is to provide a method and apparatus for monitoring several points in a spectrum simultaneously with a single spectrometric instrument.

The invention contemplates a means for obtaining a continuous signal representing the output of a spectrometric instrument at a plurality of selected points in the spectral scan of said instrument. For each selected point the apparatus comprises comparison means for determining the instant at which said instrument is operating at the selected point within the spectral scan and means for sampling the output of said instrument at that instant in response to the comparison means and maintaining a signal which is a fixed function of the sampled output of the instrument during the time in which the instrument is not operating at the selected point.

The foregoing and other objects and advantages will become apparent from the following detailed description when taken in conjunction with the drawings wherein.

Figure 1:
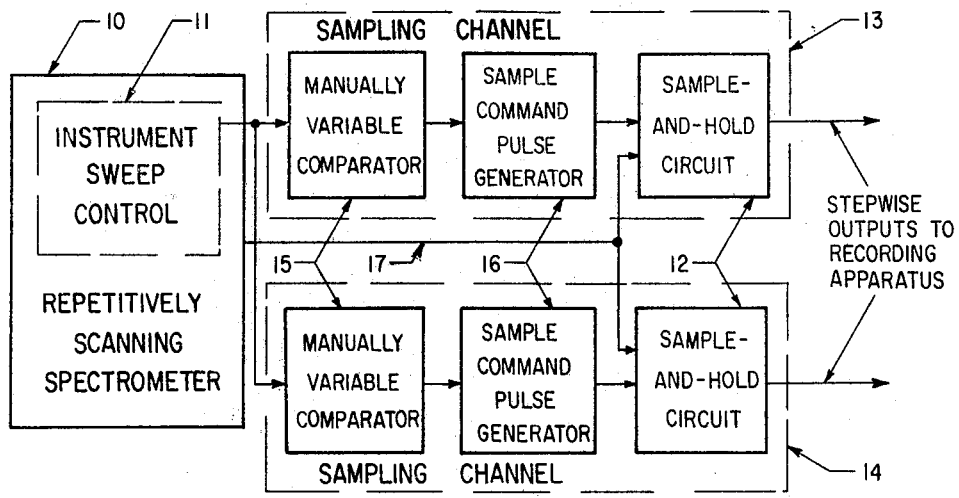
FIGURE 1 is a block diagram of the novel sampling unit.
Figure 2:
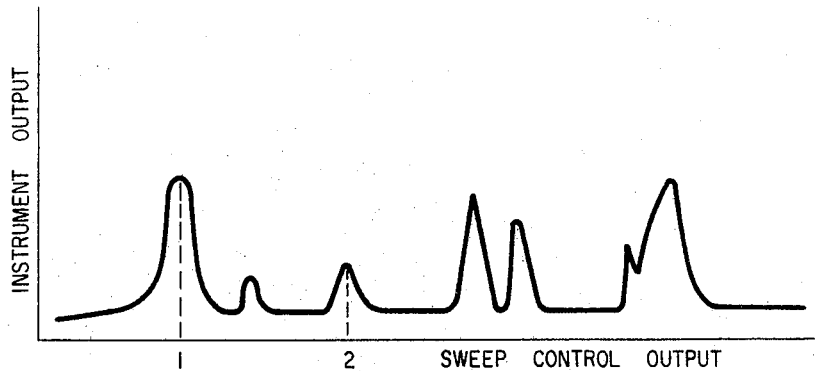
FIGURE 2 represents a typical output signal variation of a spectrometric instrument during a single spectral scan.

FIGURE 1 shows a repetitively scanning spectrometric instrument or spectrometer 10 which is provided with a sweep control 11 which causes the instrument to scan repetitively and also provides a signal which indicates the position of the current operating point within the spectral scan. The indicating signal from the sweep control be a purely mechanical output such as the position of a cam on a rotating or reciprocating shaft; it may be an electrical output of an electromechanical transducer such as a variable transformer or potentiometer or counter driven by a rotating or reciprocating shaft; or it may be a purely electrical indication such as the output of a sawtooth generator, the output of an electronic counter or the analog output of a digital-to-analog converter connected to such a counter.

Although for simplicity of illustration FIGURE 1 shows only two sampling channels 13 and 14, it is understood that any number of channels can be added, one for each of the spectral points to be selected. Each sampling channel comprises the following: a comparator 15 which determines from the output of the sweep control 11 the instant when the spectrometer is operating at a specific point in the spectral scan, this point being selected by manual adjustment of the comparator; a sample command pulse generator 16 which generates a pulse in response to the comparator output; and a sample-and-hold circuit 12 which in response to this pulse samples the spectral intensity output which it receives from the spectrometer through a connection 17. The outputs of the sample-and-hold circuits may be connected to utilization apparatus such as meters or recorders.

One example of a spectrometric instrument suitable for use with this invention is the well-known magnetic-deflection mass spectrometer in which a rapid scan is achieved by varying an ion-accelerating voltage according to a saw-tooth pattern. In such case the sweep control 11 is a saw-tooth voltage generator, and the comparator 15 is a circuit which compares the instantaneous sawtooth amplitude with an internal reference amplitude which can be manually adjusted to any desired value within the range of the saw-tooth voltage. When the saw-tooth voltage crosses the reference level, the comparator output rises sharply. This abrupt rise is detected by an appropriately coupled one-shot multivibrator which serves as the sample command pulse generator 16. The sample-and-hold circuit 12, upon receipt of the multivibrator output, which is a short spike, samples the spectral intensity output of the mass spectrometer by gating this output into a capacitor. Upon completion of the spike the input to the capacitor is opened. The capacitor is connected to the input of a high input impedance amplifier whose output is proportional to the voltage across the capacitor and hence to the sampled output of the spectrometer. Because of the high input impedance of the amplifier, the voltage across the capacitor is maintained essentially constant until another spike is received.

Figure 3:
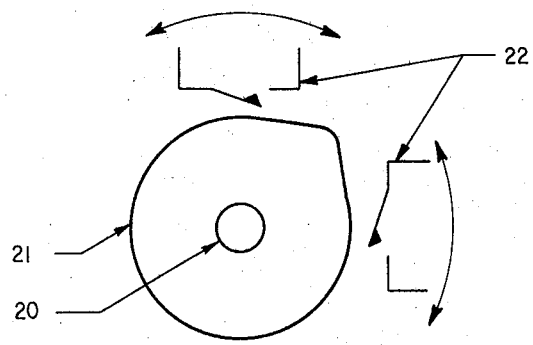
FIGURE 3 is a schematic illustration of a mechanical comparator for use on an optical spectrometer.

Another example of a spectrometric instrument suitable for use with this invention is an optical spectrometer in which the spectral scan is accomplished by rotating a chromatic light analyzer such as a prism or grating. In this case the sweep control 11 is a device such as a motor which repetitively turns the prism or grating thru its usable range of positions. The comparator 15 could conveniently comprise an arrangement such as that shown in FIGURE 3 in which a cam 21 is mounted on the prism or grating drive shaft 20 and actuates several microswitches 22 each of which may be placed at any angular position around the drive shaft as indicated by the arrows. Although only two microswitches are shown in FIGURE 3, it will be understood that any number may be used. When the prism or grating is at a position corresponding to a selected spectral line, the cam momentarily actuates the microswitch which has been positioned to correspond to that line. The output of the microswitch feeds the sample command pulse generator 16 as before.

To illustrate the simplicity of use from the operator's standpoint, the output of each sample-and-hold circuit is treated by the operator as though he were using the spectrometer to monitor a single peak without scanning at all. The operator simply scans the spectrum by manually adjusting the comparator while monitoring the output of the sample-and-hold circuit, and sets the comparator for any desired spectral peak. The time variation of the amplitude of the selected peak may then be metered or recorded at the output of the sample-and-hold circuit. This output changes in stepwise fashion. As the spectrometer repetitively scans the spectrum, the output of the sample-and-hold circuit assumes a value during each scan which corresponds to the amplitude of the selected peak as measured by the spectrometer during that scan.

Thus there has been described a sampling unit for continuous immediate display of the spectral intensity at one or more selected points in a spectrum. The continuous monitoring of several spectral points can, by using this novel sampling device, be accomplished with a single spectrometric instrument.

From the foregoing it is believed that the invention may be readily understood by those skilled in the art. Various changes may be made in the specific details disclosed without departing from the spirit or scope of the invention.

What is claimed is:

1. In a system for obtaining a continuous signal representing the output of a repetitively scanning spectrometric instrument at a plurality of points in the spectral scan of said instrument, said instrument including a sweep control for advancing the sweep in increments and producing a pulse each time sweep is advanced, the combination comprising for each selected point, sweep monitoring means coupled to said sweep control and demarcating the instant at which the sweep is at said selected point, said sweep monitoring means including pulse responsive circuitry for determining from each said pulse the instantaneous operating point within the spectrum, and signal storage means coupled to said sweep monitoring means, said signal storage means storing intact for a predetermined duration a new signal which is a fixed function of the output of said instrument each time said sweep monitoring means demarcates said instant.

2. In a system for obtaining a continuous signal representing the output of a repetitively scanning spectrometric instrument at a plurality of points in the spectral scan of said instrument, said instrument including a sweep control, the combination comprising for each selected point, a manually variable comparator coupled to said sweep control and demarcating each instant at which the sweep is at a manually selected point, pulse generator means responsive to said comparator for producing an output pulse at each of said instants, and sample-and-hold circuit means jointly responsive to said pulse generator means and the output of said instrument for storing a new voltage at each of said instants, the amplitude of voltage newly stored at any given instant being a fixed function of the instantaneous output amplitude of said instrument at said given instant.

3. The system of claim 2 wherein said spectrometric instrument comprises an optical spectrometer, said sweep control comprises a mechanical drive for a chromatic analyzer, said comparator comprises a rotating cam driven in synchronism with said chromatic analyzer, and said pulse generator comprises a microswitch positionable at any desired angular position in relation to said cam, said microswitch being actuable by said cam.

4. In a system for obtaining a continuous signal representing the output of a repetitively scanning spectrometric instrument at a plurality of selected points within the spectral scan of said instrument, said instrument including a mechanical sweep control, the combination comprising: transducer means coupled to said mechanical sweep control for converting the position of said mechanical sweep control to an electrical signal; a plurality of sampling channels, each of said channels including sweep monitoring means responsive to said transducer means for demarcating the instant at which the sweep is at a selected point, and signal storage means storing a new signal which is a fixed function of the output of said instrument each time said sweep monitoring means demarcates said instant; and means responsive simultaneously to each of said signal storage means for recording the level of signal in each of said signal storage means.

5. In a system for continuously monitoring the output of a repetitively scanning spectrometric instrument at a plurality of selected points in the spectral scan of said instrument, said instrument including a sweep control for advancing the sweep in increments and producing a pulse each time the sweep is advanced, the combination comprising: a plurality of sampling channels, each of said channels including sweep monitoring means responsive to said sweep control for demarcating the instant at which the sweep is at a selected point, said sweep monitoring means including pulse responsive circuitry for determining from each said pulse the instantaneous operating point within the spectrum, and signal storage means storing intact for a predetermined duration a new signal which is a fixed function of the output of said instrument each time said sweep monitoring means demarcates said instant; and means responsive simultaneously to each of said signal storage means for separately recording the level of signal in each of said signal storage means.

References Cited

UNITED STATES PATENTS

| 2,480,636 | 8/1949 | Dieke. |
| 3,071,037 | 1/1963 | Brumley. |
| 3,297,860 | 1/1967 | Weiss. |

RONALD L. WIBERT, Primary Examiner

V. P. McGRAW, Assistant Examiner

U.S. Cl. X.R.

356—180